US006840269B2

(12) United States Patent
Lee

(10) Patent No.: US 6,840,269 B2
(45) Date of Patent: Jan. 11, 2005

(54) PRESSURE REDUCER FOR A FLUID SAMPLING DEVICE

(75) Inventor: Han-Chang Lee, Taoyuan (TW)

(73) Assignee: Taiwan Semiconductor Manufacturing Co., Ltd., Hsin Chu (TW)

(*) Notice: Subject to any disclaimer, the term of this patent is extended or adjusted under 35 U.S.C. 154(b) by 159 days.

(21) Appl. No.: 10/143,654

(22) Filed: May 9, 2002

(65) Prior Publication Data
US 2003/0209272 A1 Nov. 13, 2003

(51) Int. Cl.[7] ............................................. G05D 16/08
(52) U.S. Cl. ........................... 137/505.13; 137/505.18; 137/505.38
(58) Field of Search ...................... 137/505.13, 505.18, 137/505.38; 251/37

(56) References Cited

U.S. PATENT DOCUMENTS

| | | | | |
|---|---|---|---|---|
| 357,763 A | * | 2/1887 | Darling | 137/505.13 |
| 1,849,601 A | * | 3/1932 | Vinson | 137/505.38 |
| 2,039,587 A | * | 5/1936 | Luigi | 137/505.18 |
| 3,557,831 A | * | 1/1971 | Katchka | 137/505.18 |
| 3,774,628 A | * | 11/1973 | Norton et al. | 137/505.18 |

* cited by examiner

Primary Examiner—Stephen M. Hepperle
(74) Attorney, Agent, or Firm—Tung & Associates

(57) ABSTRACT

The present invention generally relates to a pressure reducer that can regulate a fluid sample flow and decrease pressure automatically without adding any extra media. More particularly the pressure reducer has a casing having a sample inlet for receiving the fluid sample from a fluid sample source, and a sample outlet for dispensing the fluid sample to another location; a separation plate; an upper chamber; a lower chamber, wherein the casing and the separation plate cooperate to define the lower chamber and the upper chamber, and wherein the lower chamber is in communication with the upper chamber; and means for reducing pressure of a fluid dispensed through the pressure reducer.

18 Claims, 2 Drawing Sheets

PRESSURE REDUCER FOR A FLUID SAMPLING DEVICE

BACKGROUND OF THE INVENTION

In the deep sub-micron era, global planarization has become an essential process for high density IC processing. Slurries were adopted as abrasive in chemical mechanical polishing processes for producing global planarization of a wafer surface. Slurry blending requirements vary from process to process, i.e., slurry must be blended to meet a tools-specified blend ration. Tungsten and copper slurry were blended from slurry concentrate with DI water and oxidizer. The accuracy of oxidizer concentration present in the slurry significantly influences the polishing ration. Therefore, an efficient and reliable sampling and titrating device is strongly required for slurry blending system. For cost reduction, usually, one titrating device must measure slurry samples from a low pressure mixing station and a high pressure dispensing module respectively. Therefore, a sampling six-ports valve used in a titrating device can be very easily damaged by high pressure slurry dispensed from a high pressure dispensing module. When the sampling six-ports valve is damaged, it causes the titration device to take more samples than desired and causes a wrong reading of the slurry measurement.

It is an object of the present invention to provide a pressure reducer to keep the sample flow through a six-port titrating device stable, thereby increasing the measuring accuracy and lifetime of the sampling valve.

It is an object of the present invention to provide a pressure reducer that automatically decreases flow pressure from a high pressure incoming slurry sample without adding any extra media or slurry.

It is an object of the present invention to avoid slurry crystallization by providing a pressure reducer free of dead space.

It is another object of the present invention to provide a pressure reducer in a sampling device that can reduce loop pressure within a titration device and keep the sample flow stable.

It is another object of the present invention to increase the measuring sensitivity by taking accurate quantity of samples for a titrating device.

It is another object of the present invention to provide a device to allow a constant flow and low pressure for a titrating system to increase the lifetime of sampling valves.

It is another object of the present invention to provide a pressure reducer that does not have a metal spring to decrease the risk of metal contamination within a titrating system.

It is another object of the present invention to provide a pressure reducer for hazardous chemical such as slurry using in a CMP process for flow of slurry through a titrating system.

SUMMARY OF THE INVENTION

According to the present invention, there is provided a pressure reducer for dispensing a fluid sample from a fluid sample source at a constant low pressure having:

(a) a casing, the casing having a sample inlet for receiving the fluid sample from a fluid sample source, and a sample outlet for dispensing the fluid sample from the pressure reducer to another location, wherein the sample inlet is in communication with the sample outlet;

(b) a separation plate;

(c) an upper chamber;

(d) a lower chamber, wherein the casing and the separation plate cooperate to define the lower chamber and the upper chamber, and wherein the lower chamber is in communication with the upper chamber; and (e) means for reducing pressure of a fluid dispensed through the pressure reducer.

Additionally, there is provided a method of using the pressure reducer described above in a CMP process to formulate a proper blend ration having the steps of:

(a) providing a low pressure slurry sample from a low pressure slurry source to a low pressure slurry sample inlet;

(b) directing the flow of the low pressure slurry sample from the low pressure slurry sample inlet through a first three-way valve to an inlet tube;

(c) providing a high pressure slurry sample from a high pressure slurry source;

(d) directing the flow of the high pressure slurry sample from a high slurry sample inlet through a second three-way valve to the inlet tube to form a slurry mixture of low pressure and high pressure slurry;

(e) regulating the pressure of the slurry mixture by having the slurry mixture flow through the pressure regulator;

(f) filling a sampling tube with a sample of the pressure regulated slurry mixture;

(g) filling the sampling tube with a sample of deionized water;

using the six-ports valve to mix the sample of pressure regulated slurry with the sample of deionized water;

(h) communicating the slurry-deionized water mixture slurry to a measuring beaker; and (i) titrating the slurry-deionized water mixture with an oxidizer to meet a tools-specified blend ration.

BRIEF DESCRIPTION OF THE DRAWINGS

These and other objects, features and advantages of the present invention will become apparent from the following detailed description and the appended drawings in which.

DETAILED DESCRIPTION OF THE PREFERRED EMBODIMENTS

Figure 1:
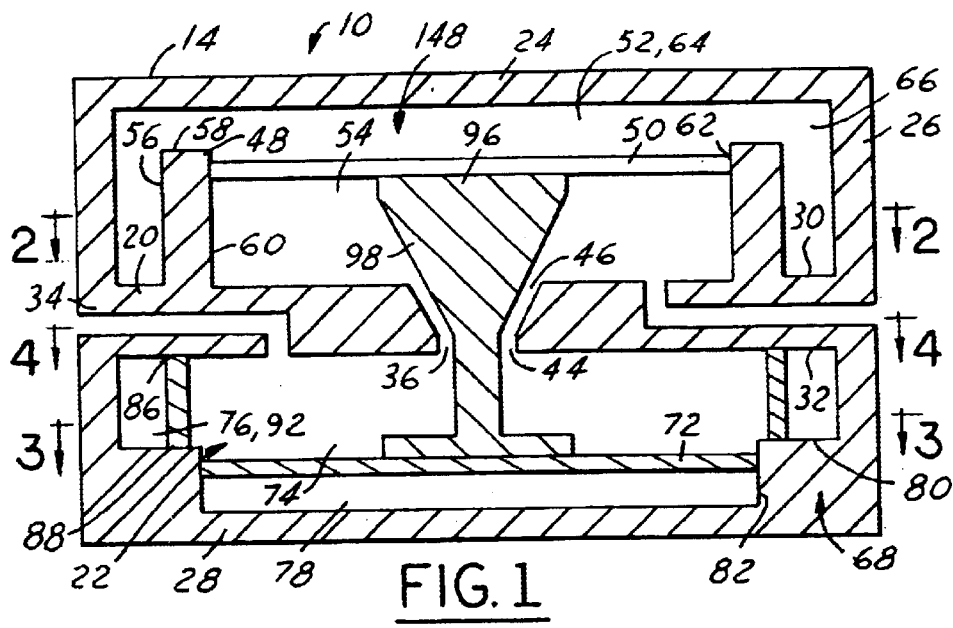
FIG. 1 is a side cross-sectional view of a pressure reducer in accordance with a preferred embodiment of the present invention.

Disclosed herein is a pressure reducer 10 for dispensing a fluid sample at a constant low pressure and a method of using the pressure reducer. The pressure reducer 10 is particularly useful in a CMP titration process for regulating sample flow and decreasing pressure throughout the titration process automatically without adding any extra media. As shown in FIGS. 1–5, the invention is directed to a pressure reducer 10 having a casing 14, the casing 14 having a sample inlet 16, and a sample outlet 18, wherein the inlet is in communication with the outlet; a separation plate 20; a lower chamber 22; an upper chamber 148, wherein the casing 14 and the separation plate 20 cooperate to define the lower chamber 22 and the upper chamber 148, and wherein the lower chamber 22 is in communication with the upper chamber 148; and means for reducing pressure of a fluid dispensed through the pressure reducer.

The casing 14 has an upper wall 24, a side wall 26, and a lower wall. Preferably, the casing 14 is cylindrical in geometry wherein the side wall 26 is disposed between and integrally formed with the upper wall 24 and the lower wall 28 and wherein the upper wall 24 forms a circular-shaped top and the lower wall 28 forms a circular-shaped bottom for the cylindrical casing. The side wall 26 of the casing 14 has two openings disposed therethrough that are preferably spaced 180° apart. The first opening defines the sample inlet 16 for receiving a fluid, preferably a slurry used in a CMP process from a high pressure or a low pressure source and the second opening defines the sample outlet 18 for dispensing the slurry at a low pressure to another location, preferably at 20 psi.

The separation plate 20 cooperates with the casing 14 to define the upper chamber 148 and the lower chamber 22. Preferably, the casing 14 and separation plate 20 are made from a polymeric material such as plastic or any other suitable material that will not chemically react with a slurry composition. The separation plate 20 is horizontally disposed between the upper chamber 148 and the lower chamber 22 and operates to partially separate the upper chamber 148 from the lower chamber 22. The separation plate 20 is preferably, perpendicular to the casing side wall 26.

Figure 3:
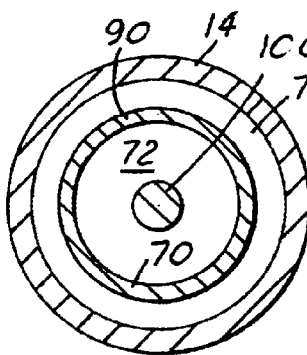
FIG. 3 is a top cross-sectional view of the pressure reducer in FIG. 1 taken along section 3—3 in accordance with a preferred embodiment of the present invention.

The separation plate 20 is integrally formed with the casing 14 and has a top surface 30; a bottom surface 32; a middle region 34 disposed between the top surface 30 and the bottom surface 32; a first bore 36 disposed transversely through the separation plate 20 for communication of fluid from the lower chamber 22 to the upper chamber 148; a second bore 38 longitudinally disposed through the middle region 34 and the top surface 30, wherein the second bore 38 is in communication with and is disposed between the sample inlet 16 and the lower chamber 22 for communication of fluid from the sample inlet 16 through the second bore 38 to the lower chamber 22; and a third bore 40 disposed longitudinally through the middle region 34 and the top surface 30 in communication with and disposed between the sample outlet 18 and the upper chamber 148 for communication of fluid from the upper chamber 148 through the third bore 40 to the sample outlet 18. As shown in FIG. 3, preferably, the separation plate 20 further has means for communication of fluid from an outer side portion 76 of the lower chamber 22 to an outer upper portion of the upper chamber 148 as described further below, wherein the means is preferably, at least a fourth bore 42 transversely disposed therethrough. However, in an alternative embodiment, the means for communication of fluid from an outer side portion 76 of the lower chamber 22 to an outer upper portion of the upper chamber 148 may be a plurality of bores disposed transversely therethrough.

Preferably, the first bore 36 is tapered, the tapered first bore 36 having a narrow opening 44 in communication with the lower chamber 22 and a wider opening 46 in communication with the upper chamber 148.

The upper chamber 148 has a support ring 48, the support ring 48 is integrally formed with the separation plate 20; and an upper diaphragm 50, wherein the support ring 48 and the upper diaphragm 50 cooperate to define an upper outer portion 52, and an upper inner portion 54. The upper chamber 148 is in communication with the sample outlet 18 and is in further communication with the sample inlet 16.

The support ring 48 has an outer side 56, a top side 58, and an inner side 60. The support ring 48 is preferably, cylindrical and is integrally formed with the separation plate 20 and is disposed within the upper chamber 148. Preferably, the support ring 48 is parallel to the casing side wall 26, wherein the support ring 48 is spaced apart from the casing side wall 26 and protrudes vertically upwardly from the horizontal separation plate 20 towards the casing upper wall 24 but does not engage the casing upper wall 24. The support ring 48 operates to support an upper diaphragm 50 that is horizontally disposed within the upper chamber 148.

The upper diaphragm 50 is preferably, circular in shape having an outer peripheral edge 62 that slidably and sealably engages the inner side 60 of the support ring 48. The upper diaphragm 50 operates as a slidable water-tight barrier between the outer portion of the upper chamber 148 and the inner portion 74 of the upper chamber 148. When the pressure flowing through the pressure reducer 10 is low, preferably 20 psi, the upper diaphragm is normally biased in a first position flush with the top side 58 of the support ring 48. As the pressure flowing through the pressure reducer 10 is increased above 20 psi, the upper diaphragm 50 moves downwardly relative to the support ring 48 between the first position and a second position. As the pressure of the fluid flowing through the pressure reducer 10 decreases from a high pressure greater than 20 psi back to a low pressure of 20 psi or lower, the upper diaphragm 50 moves upwardly relative to the support ring 48 from the second position to the upper diaphragm's normally biased first position.

Figure 2:
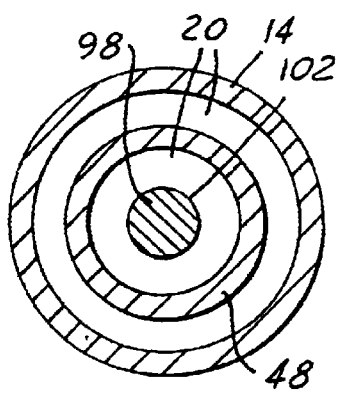
FIG. 2 is a top cross-sectional view of the pressure reducer in FIG. 1 taken along section 2—2 in accordance with a preferred embodiment of the present invention.

The upper diaphragm 50, the support ring 48, and the casing 14 cooperate to define the outer portion of the upper chamber 148. When the upper diaphragm is flush with the top side 58 of the support ring 48, the outer portion defines an upper chamber channel 64 having an inverted u-shaped cross section 66 as shown in FIGS. 1–2. The upper chamber channel 64 is formed between the outer side 56 of the support ring 48 and the casing side wall 26, and between the upper circular diaphragm and the casing upper wall 24. Preferably, the upper chamber channel 64 is filled with water.

The lower chamber 22 has disposed therewithin a shelf 68 integrally formed with the casing side wall 26 and the casing lower wall; a vertical diaphragm 70; and a lower horizontal diaphragm 72, wherein the shelf 68 and the vertical diaphragm 70 cooperate to form a sealable barrier between an inner portion 74 of the lower chamber 22 and an outer side portion 76 of the lower chamber 22, and wherein the shelf 68 and the vertical diaphragm 70 cooperate to form a sealable barrier between the inner portion 74 of the lower chamber 22 and an outer lower portion 78 of the lower chamber 22. The shelf 68 has a horizontal surface 80 that supports the lower vertical diaphragm and a vertical surface 82 for engaging the lower horizontal diaphragm 72.

The vertical diaphragm 70 has a uniform vertical wall 84 surrounding the inner portion 74 of the lower chamber 22. Preferably, the vertical diaphragm 70 is cylindrical in geometry and is made from a resilient material. The cylindrical diaphragm uniform wall has an upper peripheral edge 86 that slidably and sealably engages the bottom surface 32 of the separation plate 20 and a lower peripheral edge 88 that slidably and sealably engages the horizontal surface 80 of the shelf 68. The vertical diaphragm 70 forms a sealable barrier between the inner portion 74 of the lower chamber 22 and the outer side portion 76 of the lower chamber 22.

Figure 4:
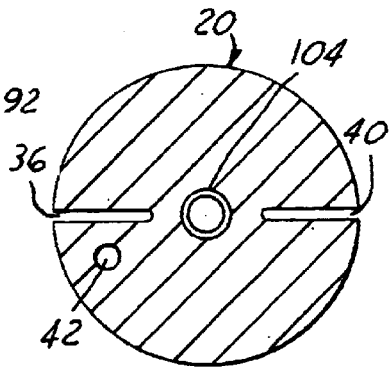
FIG. 4 is a cross-sectional view of the pressure reducer in FIG. 1 taken along section 3—3 to show a separation plate in accordance with a preferred embodiment of the present invention.

As shown in FIG. 4, the lower diaphragm is preferably, circular in shape having an outer peripheral edge 90 that slidably and sealably engages the shelf 68. The lower diaphragm operates as a slidable air-tight barrier between the outer lower portion 78 of the lower chamber 22 and the inner portion 74 of the lower chamber 22.

When the pressure of the fluid flowing through the pressure reducer 10 is low, preferably 20 psi or lower, the lower diaphragm is normally biased in a first position flush with the horizontal surface 80 of the shelf 68. As the pressure of the fluid flowing through the pressure reducer 10 is increased above 20 psi, the lower diaphragm moves downwardly relative to the shelf 68 between the first position and a second position. As the pressure flowing through the pressure reducer 10 is increased above 20 psi, the lower horizontal diaphragm 72 moves downwardly relative to the shelf 68 between the first position and a second position. As the pressure of the fluid flowing through the pressure reducer 10 decreases from a high pressure greater than 20 psi back to a low pressure of 20 psi or lower, the lower horizontal diaphragm 72 moves upwardly relative to the shelf 68 from the second position to the lower horizontal diaphragm's normally biased first position.

The outer side portion 76 of the lower chamber 22 is disposed between the vertical diaphragm 70 and the casing side wall 26. The outer side portion 76 defines a side channel 92 that is in communication with the upper chamber channel 64, preferably through the at least fourth bore 42 disposed within the separation plate 20. The side channel 92 is filled with the same fluid; preferably water, as is disposed within the upper chamber channel 64. As shown in the preferred embodiment of FIG. 4, when the vertical diaphragm 70 is cylindrical, the side channel 92 has a circular ring cross section. When the pressure increases above 20 psi within the inner portion 74 of the lower chamber 22, the lower vertical diaphragm 70 uniform wall expands, thereby increasing the pressure of the fluid disposed within the side channel 92. Because the side channel 92 is in communication with the upper channel, the increased fluid pressure of the fluid disposed within the side channel 92 also increases the pressure of the fluid within the upper channel. Thus, the increased pressure of the fluid disposed within the upper channel forces the upper diaphragm 50 to move downwardly.

The outer lower portion 78 of the lower chamber 22 is disposed between the lower horizontal diaphragm 72 and the casing bottom wall, wherein the outer lower portion 78 defines a bottom channel that is not in communication with either the outer side channel 92 or the upper chamber channel 64. The bottom channel is preferably, filled with air.

The means for reducing pressure of a fluid flowing through the pressure reducer 10 is defined by a plug 96 that cooperates with the upper diaphragm 50 and the lower diaphragm to regulate flow of fluid flowing through the pressure reducer.

Figure 5:
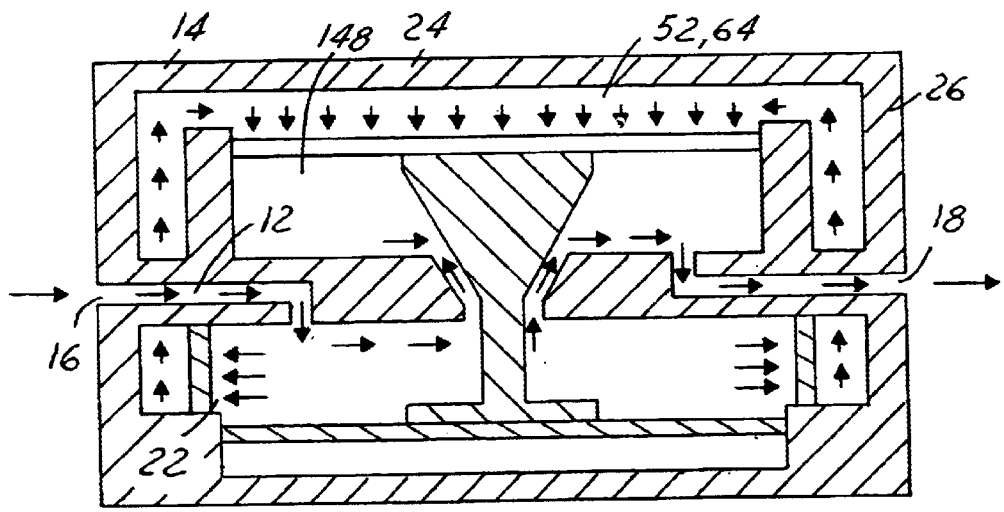
FIG. 5 is a side cross-sectional view of a pressure reducer showing fluid flow paths within the pressure reducer in accordance with the present invention.

As shown in FIGS. 1 and 5, the plug 96 is movably disposed between the upper diaphragm 50 and the lower diaphragm, wherein the plug 96 has a funnel portion 98 that engages the upper diaphragm 50, and a vertical uniform portion 100 integrally formed with the funnel portion 98 and extending axially downwardly therefrom, the vertical uniform portion 100 engages the lower diaphragm and is further disposed axially within the first bore 36 of the separation plate 20. The plug funnel portion 98 has a peripheral wall 102 that is complementary in shape to the shape of the first bore 36 of the separation plate 20 but does not engage the first bore 36. Thus, the funnel portion 98 is spaced furthest apart from the first bore 36 of the separation plate 20 forming a large gap 104 between the plug 96 and the first bore 36 when there is low pressure fluid, preferably 20 psi or lower, flowing through the pressure reducer 10 for communication of fluid between the lower chamber 22 and the upper chamber 148. However, as the fluid pressure increases above 20 psi, the funnel portion 98 moves closer to the first bore 36, thereby reducing the gap 104 and restricting flow of fluid through the pressure reducer.

The cross section of the vertical uniform portion 100 is less than the cross section of the first bore 36. In a preferred embodiment, as shown in FIGS. 1 and 3, when the first bore 36 is tapered, the cross section of the vertical uniform portion 100 is cylindrical and has a diameter less than a diameter of the narrow opening 44 tapered first bore 36 to allow communication of fluid between the lower chamber 22 and the upper chamber 148.

According to a preferred embodiment, as shown in FIG. 5 in operation, a low pressure fluid flows from the sample inlet 16 to the lower chamber 22 and then to the upper chamber 148. Next, the lower pressure fluid flows from the upper chamber 148 through the outlet. As the pressure increases from the fluid flowing through the inlet, the fluid fills the lower chamber 22 and forces the vertical diaphragm 70 to move outwardly as described above, thereby increasing the pressure of the fluid, preferably water, in the upper channel. The increased water pressure of the water in the upper channel then forces the upper diaphragm 50 to move downwardly. The force of the upper diaphragm 50 against the plug 96 forces the plug 96 and then lower horizontal diaphragm 72 to correspondingly move downwardly. As the plug 96 moves downwardly, the gap 104 between the plug 96 and the separation plate first bore 36 narrows, thereby restricting flow of slurry through the pressure reducer 10 from the inlet to the outlet to maintain a constant outlet slurry pressure, preferably of 20 psi. The downward movement of the lower horizontal diaphragm 72 compresses the air disposed within the outer lower portion 78. As the pressure decreases from a pressure above 20 psi down to a pressure of 20 psi or below, the compressed air within the outer lower portion 78 applies an upward force to the plug 96, thereby moving the plug 96 back to its normally biased position wherein the gap 104 between the plug 96 and the first bore 36 is at a maximum. The pressure reducer 10 can regulate sample flow and decrease pressure automatically without adding any extra media.

Figure 6:
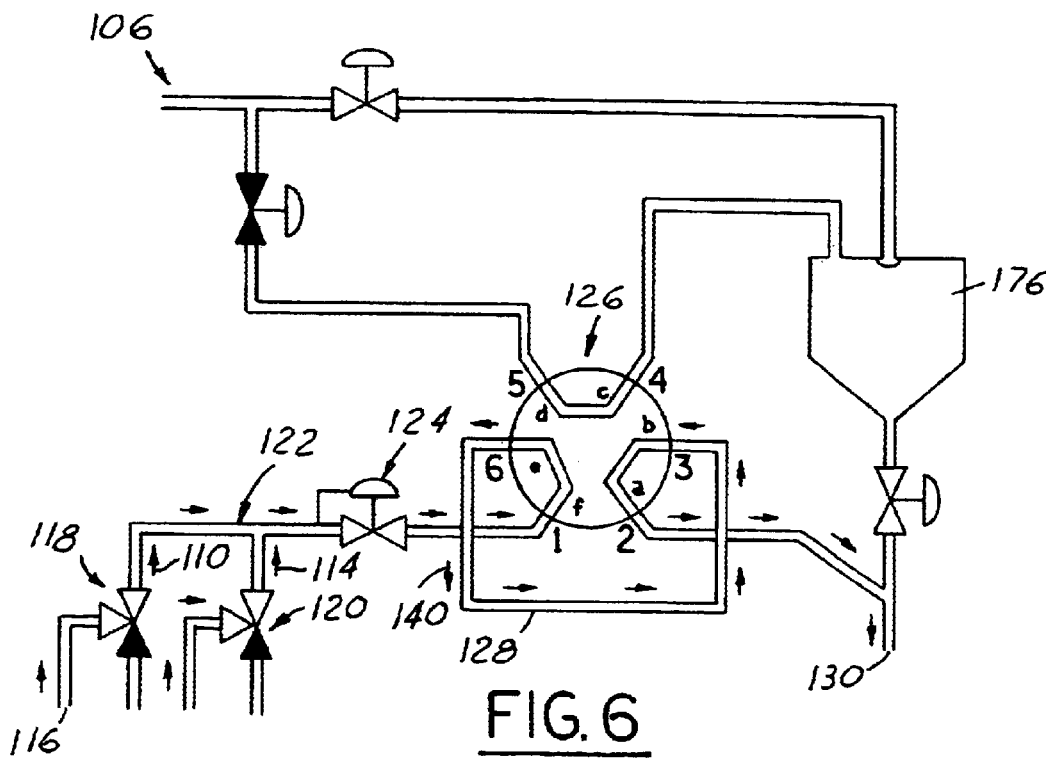
FIG. 6 is a schematic of a slurry mixing and titration system in accordance with a preferred embodiment of the present invention.
Figure 7:
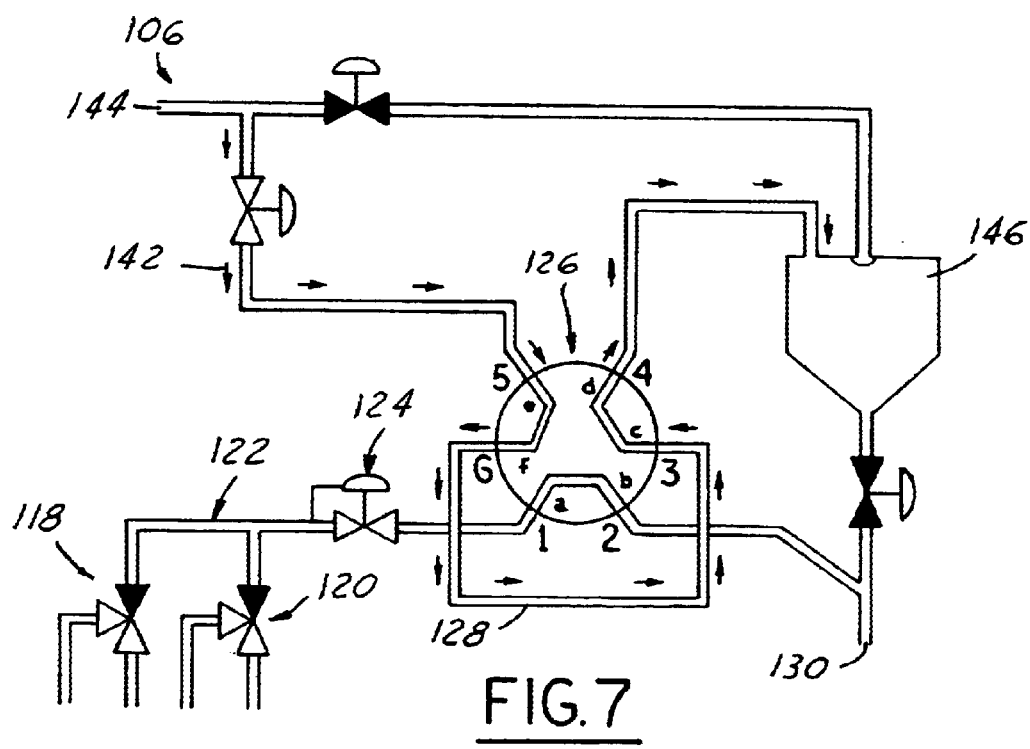
FIG. 7 is a schematic of a slurry mixing and titration system in accordance with a preferred embodiment of the present invention.

In another preferred embodiment as shown in FIGS. 6–7, slurry samples are supplied from a slurry mixing and dispensing system 106 to titrate the slurry mixture with deionized water and an oxidizer. Initially, a low pressure slurry sample 110 from a low pressure slurry source and a high pressure slurry sample 114 from a high pressure slurry source flows through two three-way valves, 118, 120, respectively, an inlet tube 122, a pressure reducer 124, a sampling six-ports valve 126, a sampling tube 128, and then to a drain 130.

The pressure reducer 124 is similar to the pressure reducer 10, wherein the fluid flowing through the inner upper chamber and inner lower chamber is a slurry composition of preferably tungsten and copper, and wherein the fluid disposed in the outer side channel 192 (not shown) and the upper channel is water, and wherein the outer lower portion 178 (not shown) is filled with air.

There is no restriction of the slurry sample flow when the low pressure slurry sample 110, preferably 20 psi, flows through the pressure reducer 124. However, when the high pressure slurry sample 114 flows through the pressure reducer 124, the slurry sample flow rate will be restricted to the flow rate of the low pressure sample, preferably at a pressure of 20 psi. According to a preferred embodiment, a high pressure inlet 136 dispenses slurry to the inlet tube 122 at a high pressure of preferably 60 psi, a low pressure inlet 138 dispenses a slurry mixture 140 to the inlet tube 122 at a low pressure of preferably, 20 psi. Thus, the pressure flowing through the inlet tube 122 is greater than 20 psi.

Slurry samples flow from the inlet tube 122 through the pressure reducer 124 to the sampling tube 128. The sampling tube 128 is in further communication with the six-ports valve. The six-ports valve has ports a–e as shown in FIGS. 6–7 and rotates counterclockwise between a first position as shown in FIG. 6 and a second position as shown in FIG. 7. Initially, the six-ports valve is in the first position. The mixed slurry sample flows from the sampling tube 128 through ports f and e, and then the slurry sample flows b and a to the drain 130. After the sampling tube 128, the sampling six-ports valve 126 rotates 60 degrees counterclockwise to the second position as shown in FIG. 7. When the six-ports valve is in the second position, deioinized water 142 dispensed from a deionized water source 144 then enters ports e and f thereby mixing with the slurry sample present in ports e and f. The slurry-deionized water mixture then flow through ports c and d to transport the slurry-deionized water mixture to a measuring beaker 146 wherein the slurry-deionized water sample is titrated with deionized water to an appropriate oxidizer concentration to meet a tools-specified blend ration.

Disclosed herein is a pressure reducer of sampling device and a method of use. It will be appreciated from the above that the needs in the art are met by the devices and systems of the present invention.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A pressure reducer for dispensing a fluid sample from a fluid sample source at a constant low pressure comprising:
   a casing, said casing comprises an upper wall, a side wall, and a lower wall, wherein the side wall is disposed between and is integrally formed with the upper wall and the lower wall, said casing having a sample inlet for receiving the fluid sample from a fluid sample source, and a sample outlet for dispensing the fluid sample from the pressure reducer to another location, wherein the sample inlet is in communication with the sample outlet;
   a separation plate, said separation plate is integrally formed with the casing and is horizontally disposed between the upper chamber and the lower chamber, the separation plate further comprises a top surface, a bottom surface, a middle region disposed between the top surface and the bottom surface, a first bore disposed transversely through the separation plate for communication of fluid from the lower chamber to the upper chamber, a second bore longitudinally disposed through the middle region and the bottom surface, wherein th second bore is in communication with and is disposed between the sample inlet and the lower chamber for communication of slurry from the inlet through the second bore to the lower chamber, a third bore disposed longitudinally through the middle region and the top surface in communication with and disposed between the sample outlet and the upper chamber for communication of fluid from the upper chamber through the third bore to the sample outlet, and means for communication of fluid from an outer side portion of the lower chamber to an outer upper portion of the upper chamber;
   an upper chamber;
   a lower chamber, wherein the casing and the separation plate cooperate to define the lower chamber and the upper chamber, and wherein the lower chamber is in communication with the upper chamber; and
   means for reducing pressure of a fluid dispensed through the pressure reducer.

2. The pressure reducer of claim 1 wherein the casing is cylindrical and wherein the upper wall forms a circular top and the lower wall forms a circular bottom for the cylindrical casing.

3. The pressure reducer of claim 1 wherein the side wall of the casing comprises:
   a first opening defining the sample inlet; and
   a second opening defining the sample outlet, wherein the two openings are spaced 180 degrees apart.

4. The pressure reducer of claim 1, wherein the first bore is tapered, the tapered first bore having a narrow opening in communication with the lower chamber and a wider opening in communication with the upper chamber.

5. The pressure reducer of claim 1 comprising the upper chamber in communication with the sample outlet and in further communication with the sample inlet, the upper chamber having:
   a support ring, the support ring integrally formed with the separation plate; and
   an upper diaphragm, wherein the support ring and the upper diaphragm cooperate to define an upper outer portion, and an upper inner portion.

6. The pressure reducer of claim 5, wherein the support ring is parallel to the casing side wall, and wherein the support ring is spaced apart from the casing side wall and protrudes vertically upwardly from the horizontal separation plate towards the casing upper wall but does not engage the casing upper wall and wherein the support ring comprises:
   an outer side,
   a top side, and
   an inner side.

7. The pressure reducer of claim 6, wherein the support ring is cylindrical.

8. The pressure reducer of claim 6 comprising an upper diaphragm horizontally disposed within the upper chamber, the upper diaphragm having an outer peripheral edge slidably and sealably engaging the inner side of the support ring such that the upper diaphragm operates as a slidable water-tight barrier between the outer portion of the upper chamber and the inner portion of the upper chamber, and wherein the upper diaphragm is movable from a normally biased first position flush with the top side of the support ring downwardly to a second position.

9. The pressure reducer of claim 7 comprising a circular upper diaphragm horizontally disposed within the upper chamber, the upper diaphragm having an outer peripheral edge slidably and sealably engaging the inner side of the support ring such that the upper diaphragm operates as a slidable water-tight barrier between the outer portion of the upper chamber and the inner portion of the upper chamber, and wherein the upper diaphragm is movable from a normally biased first position flush with the top side of the support ring downwardly to a second position.

10. The pressure reducer of claim 8 wherein the upper diaphragm, the support ring, and the casing cooperate to define the outer portion of the upper chamber, the outer portion of the upper chamber has an upper chamber channel formed between the outer side of the support ring and the casing side wall, and between the upper diaphragm and the casing upper wall.

11. The pressure reducer of claim 10 wherein the upper chamber channel is filled with water.

12. The pressure reducer of claim 1 wherein the lower chamber comprises:
   a shelf integrally formed with the casing side wall and the casing lower wall, the shelf having a horizontal surface and a vertical surface;
   a lower vertical diaphragm having a uniform vertical wall surrounding the inner portion of the lower chamber, the uniform wall having an upper peripheral edge that slidably and sealably engages the bottom surface of the separation plate and a lower peripheral edge that slidably and sealably engages the horizontal surface of the shelf; and
   a lower horizontal diaphragm, the lower horizontal diaphragm having an outer peripheral edge that slidably and sealably engages the vertical surface of the shelf, wherein the shelf and the vertical diaphragm cooperate to form a sealable barrier between an inner portion of the lower chamber and an outer side portion of the lower chamber, and wherein the shelf and the vertical diaphragm cooperate to form a sealable barrier between the inner portion of the lower chamber and an outer lower portion of the lower chamber.

13. The pressure reducer of claim 12 wherein the vertical diaphragm is cylindrical and is made from a resilient material and wherein the lower diaphragm is circular in shape.

14. The pressure reducer of claim 12 wherein the outer side portion of the lower chamber disposed between the vertical diaphragm and the casing side wall defines a side channel that is in communication with the upper chamber channel, and wherein the outer lower portion of the lower chamber disposed between the lower horizontal diaphragm and the casing lower wall defines a bottom channel.

15. The pressure reducer of claim 12 wherein the means for reducing pressure of a fluid flowing through the pressure reducer comprises:
   a plug movably disposed between the upper diaphragm and the lower diaphragm, the plug cooperating with the upper diaphragm and the lower diaphragm to regulate flow of fluid flowing through the pressure reducer, the plug having
      a funnel portion engaging the upper diaphragm, the funnel portion having a peripheral wall complementary in shape to the shape of the first bore of the separation plate, wherein the funnel portion does not engage the first bore thereby forming a gap between the plug and the first bore of the separation plate, wherein the gap is wide when a low pressure fluid flows through the pressure reducer, and wherein the gap narrows as the plug moves axially downwardly when a high pressure fluid flows through the pressure reducer; and
      a vertical portion integrally formed with the funnel portion extending axially downwardly therefrom, the vertical portion engaging the lower diaphragm and wherein the vertical portion is further disposed axially within the first bore of the separation plate, the cross section of the vertical uniform portion is less than the cross section of the first bore.

16. A pressure reducer dispensing a slurry sample from a slurry sample source to another location at a constant low pressure comprising:
   a cylindrical casing, the casing having
      an upper wall forming a circular top,
      a side wall having a sample inlet for receiving the fluid sample from a fluid sample source, and a sample outlet spaced 180 degrees apart from the sample inlet for dispensing the fluid sample from the pressure reducer to another location, wherein the sample inlet is in communication with the sample outlet,
      a lower wall forming a circular bottom, wherein the side wall is disposed between and is integrally formed with the upper circular wall and the lower circular wall,
   a separation plate integrally formed with the casing and horizontally disposed between an upper chamber and a lower chamber, the upper chamber and the lower chamber in communication with each other, wherein the casing and the separation plate cooperate to define the upper and the lower chamber, the separation plate having
      a top surface, wherein a support ring extends upwardly from the top surface and is integrally formed therewith,
      a bottom surface,
      a middle region disposed between the top surface and the bottom surface,
      a first tapered bore having a narrow opening in communication with the lower chamber and a wider opening in communication with the upper chamber, wherein the first tapered bore is disposed transversely through the separation plate for communication of fluid from the lower chamber to the upper chamber,
      a second bore longitudinally disposed through the middle region and the bottom surface, wherein the second bore is in communication with and is disposed between the sample inlet and the lower chamber for communication of slurry from the inlet through the second bore to the lower chamber,
      a third bore disposed longitudinally through the middle region and the top surface in communication with and disposed between the sample outlet and the upper chamber for communication of slurry from upper chamber through the bore to the sample outlet, and
   means for communication of fluid from an outer side portion of the lower chamber to an outer upper portion of the upper chamber; and
   means for regulating the flow of slurry through the pressure reducer.

17. The means for regulating the flow of slurry through the pressure reducer comprising:
   an upper circular diaphragm slidably and sealably engaging the support ring of the upper chamber;
   a lower vertical diaphragm having a uniform vertical wall surrounding an inner portion of the lower chamber, the uniform wall having an upper peripheral edge that slidably and sealably engages the bottom surface of the separation plate and a lower peripheral edge that slidably and sealably engages a horizontal surface of the shelf;

a lower cylindrical diaphragm disposed between the bottom surface of the separation plate and a lower chamber shelf integrally formed with the casing side wall, the lower cylindrical diaphragm slidably and sealably engaging the separation plate and the lower chamber shelf; and a tapered plug complementary in shape to the first tapered bore, the plug and the first tapered bore forming a gap that is movably disposed between the upper diaphragm and the lower diaphragm, wherein the tapered plug, the first tapered bore, the upper diaphragm, the lower vertical diaphragm, and the lower cylindrical diaphragm, cooperate to regulate the pressure of slurry flowing through the pressure reducer.

18. The pressure reducer of claim 16 wherein the pressure reducer is made from a polymeric material.

* * * * *